(12) United States Patent
Windle

(10) Patent No.: US 6,606,117 B1
(45) Date of Patent: Aug. 12, 2003

(54) CONTENT INFORMATION GATHERING APPARATUS SYSTEM AND METHOD

(75) Inventor: John Richard Windle, Hebersham (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/152,322

(22) Filed: Sep. 14, 1998

(30) Foreign Application Priority Data

Sep. 15, 1997 (AU) .............................................. PO9186

(51) Int. Cl.[7] .............................................. H04N 5/262
(52) U.S. Cl. .................. 348/239; 548/222.1; 548/231.6
(58) Field of Search ........................ 348/207.99, 207.1, 348/222.1, 231.99, 231.3, 231.5, 231.6, 239, 333.01, 333.02, 333.05, 333.11, 333.12, 375; H04N 5/225

(56) References Cited

U.S. PATENT DOCUMENTS

| | | | |
|---|---|---|---|
| 4,315,251 A | | 2/1982 | Robinson et al. |
| 5,254,978 A | | 10/1993 | Beretta |
| 5,266,985 A | * | 11/1993 | Takagi .................. 348/207.99 |
| 5,510,875 A | * | 4/1996 | Yamamoto et al. ......... 396/147 |
| 5,687,408 A | * | 11/1997 | Park ........................... 396/271 |
| 6,359,650 B1 | * | 3/2002 | Murakami ............. 348/333.04 |

FOREIGN PATENT DOCUMENTS

| | | |
|---|---|---|
| AU | 693242 | 3/1996 |
| EP | 0 592 775 | 4/1994 |
| FR | 2 760 873 | 9/1998 |

* cited by examiner

Primary Examiner—Tuan Ho
(74) Attorney, Agent, or Firm—Fitzpatrick, Cella, Harper & Scinto

(57) ABSTRACT

A content gathering apparatus (100) including content collecting means (101) for gathering content information and template storage means (103) for storing at least one template including a plurality of template instructions. Processing means (104) are used to implement the template instructions. A user interface (105) displays information to a user of the apparatus (100). The template instructions, when executed, provide composition suggestions to the user of the content gathering apparatus (100) in relation to enhancing composition of the content information collected, the suggestions being provided via the user interface (105). Methods and systems for implementing the invention are also disclosed.

55 Claims, 8 Drawing Sheets

CONTENT INFORMATION GATHERING APPARATUS SYSTEM AND METHOD

The present invention relates to content information gathering devices, and, more particularly, to a method, system and apparatus to increase the composition quality of content information gathered by such devices.

The invention has been developed primarily for use with video and audio capture and recording devices, and will be described herein with reference to these applications. However, it will be appreciated that the invention is not limited to these fields.

BACKGROUND

There exists a relatively large number of devices for collecting content information such as sounds and images. These devices are frequently used in conjunction with a recording device to provide a combined collecting and recording apparatus. Examples of such combined apparatus include video cameras, digital still cameras, audio tape recorders, 3D image recorders and motion capture systems. Alternatively, content collection devices can be used in conjunction with processing devices that process the gathered content and then pass the processed information to another device. Examples of such processing devices include audio or video mixing desks, and electronic processors.

Over time, the faithfulness with which content collection devices have gathered content has steadily improved. Whilst physical, optical and mechanical advancements have provided much of this improvement, electronic assistance has also contributed greatly.

An example of the improvements in useability offered by electronic enhancements is the photographic camera. Early mechanical cameras required the user to have a relatively good understanding of the mechanisms of image production on film. This included the need for detailed knowledge about lighting, shutter speed, and aperture settings for various photograph and film types. Initially, even such relatively simple factors as available light required an estimate based on a subjective assessment by the experienced user. For these reasons, good technical reproduction film was only obtainable by professionals and knowledge amateurs, since it required much practice and experience.

In contrast, many modern cameras are equipped with electronic instruments which measure the available light and automatically adjust aperture and speed settings, taking into account the film type. As a result, the technical quality of photographs taken with modern cameras is, on average, much higher than that of older mechanical cameras, particularly for the relatively inexperienced amateur.

Whilst the technical reproduction aspects of amateur photography have improved over time, the composition, or arrangement, of subjects within captured frames has not generally improved. Even experienced amateur photographers still take shots that leave portions of the subject out of frame (eg, a person's head), take multiple pan shots which do not line up and so on. Even setting aside more subtle aesthetic or artistic aspects, the ability of professional photographers to correctly compose a photograph means that professionally taken photographs are still, on average, superior to those of amateurs.

Whilst particularly applicable to photography, the problems of composition are relevant to other areas where content information is gathered. An example is the area of audio recording. In the past, the recording of music was confined to expensive studios, and professional producers and engineers capable of correctly composing a number of available channels of sound into a "mix" to produce a master recording.

However, with rapid advancements in digital technology, relatively small operators can now buy and operate equipment that was previously restricted to the professional user. Whilst the cheaper equipment is capable of relatively high recording quality, often the composition of recorded material into a completed recording will still be of relatively low quality, due to a lack of experience and knowledge on the part of the amateur operator.

Accordingly, a need exists for a method and apparatus that overcomes one or more of the disadvantages associated with quality composition of content information collected by content collecting devices. A need exists for adding value, in a predetermined manner, to the content information.

SUMMARY

In accordance with a first aspect of the present invention, there is provided content gathering apparatus comprising:

content collecting means for gathering content information;

communication means for uploading to the enhanced gathering apparatus at least one template, wherein the template comprises a plurality of template instruction;

processing means for executing the template instructions for providing composition instructions for enhancing a composition of the gathered content information and/or provide user selection options;

memory storage means for storing the template and for storing the gathered content information; and user interface means for displaying the user selection providing option.

In accordance with a second aspect of the present invention, there is provided a method of enhancing gathered information comprising the steps of:

uploading at least one template comprising a plurality of template instructions;

receiving at least one form of content information;

executing the template instructions to generate composition instructions based on the captured content information; and enhancing a composition of the content information in accordance with the composition instructions.

Preferably, the user interface means include buttons for a user to select a desired selection option and the composition instructions are relayed to the user through a display panel device. Alternatively, at least some of the composition instruction are in the form of machine code which can directly or indirectly control hardware (e.g. content collecting unit such as charged coupled devices (CCDs) transducers etc.) to affect the composition of the gathered content information.

In accordance with a third aspect of the invention, there is provided a system for enhancing composition of gathered content information, the system including:

content collecting means for gathering content information;

template storage means for storing at least one template including a plurality of template instructions;

processing means for implementing the template instructions; and a user interface for displaying information to user of the apparatus, wherein the template instructions when executed provide composition suggestions to a user of the content gathering apparatus in relation to enhancing composition of the content information collected, the composition suggestions being provided to the user via the user interface.

Preferably, the suggestions are generated at least in part on the basis of the content information gathered.

In accordance with a fourth aspect of the present invention, there is provided a computer program product having a computer readable medium having a computer program recorded thereon for enhancing gathered information, the computer program product comprising:

means for uploading at least one template comprising a plurality of template instructions;

means for receiving at least one form of content information;

means for executing the template instructions to generate composition instructions based on the received content information; and means for enhancing a composition of the content information in accordance with the composition instructions.

BRIEF DESCRIPTION OF THE DRAWINGS

Preferred embodiment of the present invention will now be described, by way of example only, with reference to the accompanying drawings, in which, in which.

DETAILED DESCRIPTION

Figure 1:
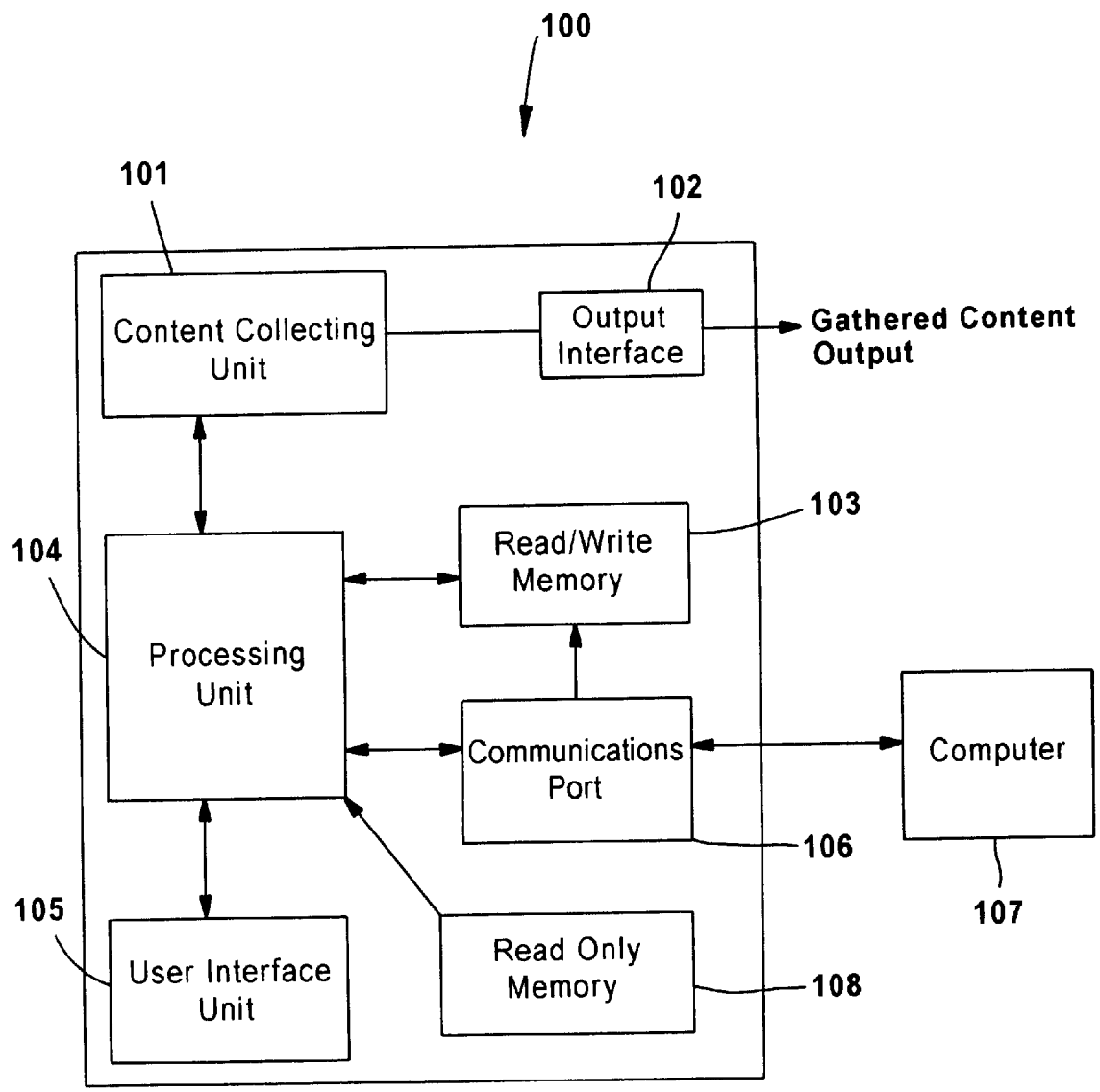
FIG. 1 is a block diagram representing an overview of an enhanced gathering device according to the embodiments of the present invention.

Referring to FIG. 1, there is shown a block diagram setting out the relationships between major components of preferred embodiments of a content gathering device 100. The components include a content collection unit 101, which is operatively connected with a processing unit 104 and an output interface 102. The processing unit 104 is also connected with a memory storage unit 103, a user interface unit 105, a read only memory (ROM) 108 and a communications port 106. the communication port also has access to data contained within the memory until 103.

In alternative embodiments, the communication port 106 can be omitted, and the memory unit 103 can be replaced with technology such as PCMCIA.

The content collection unit 101 comprises one or more content sensors, each of which is capable of collecting or gathering predetermined forms of content information. Examples of such sensors include a microphone for receiving audio data, a charge coupled device (CCD) for collecting image data, and a light sensor for measuring lighting conditions associated with collected image data.

Preferably, the content collection unit 101 further includes transducers to gather sensor information about a current state of the content sensors, or associated hardware such as the current zoom factor on a video camera. This additional data is available for use by the processing unit 104 and can be encoded as part of metadata associated with the gathered content information. The associated metadata can include such information as the date, time and location at which the image data was recorded, and the settings of the camera.

The gathered content information can be output via the output interface 102, for use by external devices. Such external devices can include content recording devices such as analogue or digital video recorders, optical disk drives, sound recording devices, image recording devices, printer devices or general purpose computers (such as an IBM-compatible personal computer, an Apple-compatible personal computer or a Sun-Workstation).

A user interface device 105 comprising a liquid crystal display (LCD) conveys information such as messages, checklists and menus to a user, and a series of control buttons (not shown) accept user input in response thereto. The control buttons can be implemented on a touch sensitive LCD.

In use, the processing unit 104, in conjunction with the memory storage unit 103 and/or the ROM 108, provides the user with a selection of currently available templates via the user interface unit 105. The user initially uses selection buttons (not shown) to select at least one of the templates.

Each template comprises a series of template instructions which can be described by a predetermined programming language. For example, the programming language may be specific to an application and proprietary to the device 100 or can be an implementation of a general purpose programming language such as Java (Trade Mark of Sun Microsystems Inc.). It will be appreciated by those skilled in the art, however, that the template can take any suitable form. For example, the template can take the form of an executable file, a script file, an expert system or database, or any other type of structure. Also, the template can include multiple components and subcomponents, each of which can take any suitable form. In this way, a template can comprise a script file in combination with, say, an expert system or any other desired combination.

In the embodiment shown, templates are updated from a general-purpose computer system 107 via the communications port 106 to the enhanced gathering device 100, and are stored in the memory storage unit 103.

In an alternative embodiment, one or more of the templates are stored on a cartridge, flashcard, magnetic or optical disc, or any other type of removable storage medium, which can simply be plugged into a suitable receptacle in the gathering device 100.

In a preferred embodiment, some or all of the template instructions are stored in the ROM 108 to reduce the amount of RAM memory required in the storage unit 103. It is particularly desirable that the ROM store at least those template instructions which are common to several templates. The template instructions are then available to the processing unit 104 for runtime calculations.

Preferably, the general purpose computer system 107 illustrated in FIG. 1 is also used as the external device previously described, and is used to download and record the content information from the content gathering device 100 via output interface 102.

The processing unit 104 interprets the template instructions, presents the user with various options from a series of menus in accordance with the interpreted instructions, and interprets user inputs. The choices selected by the user can affect the current state of the content collection unit 101, user preference settings, and the current template being used by the content gathering device 100.

Figure 11:
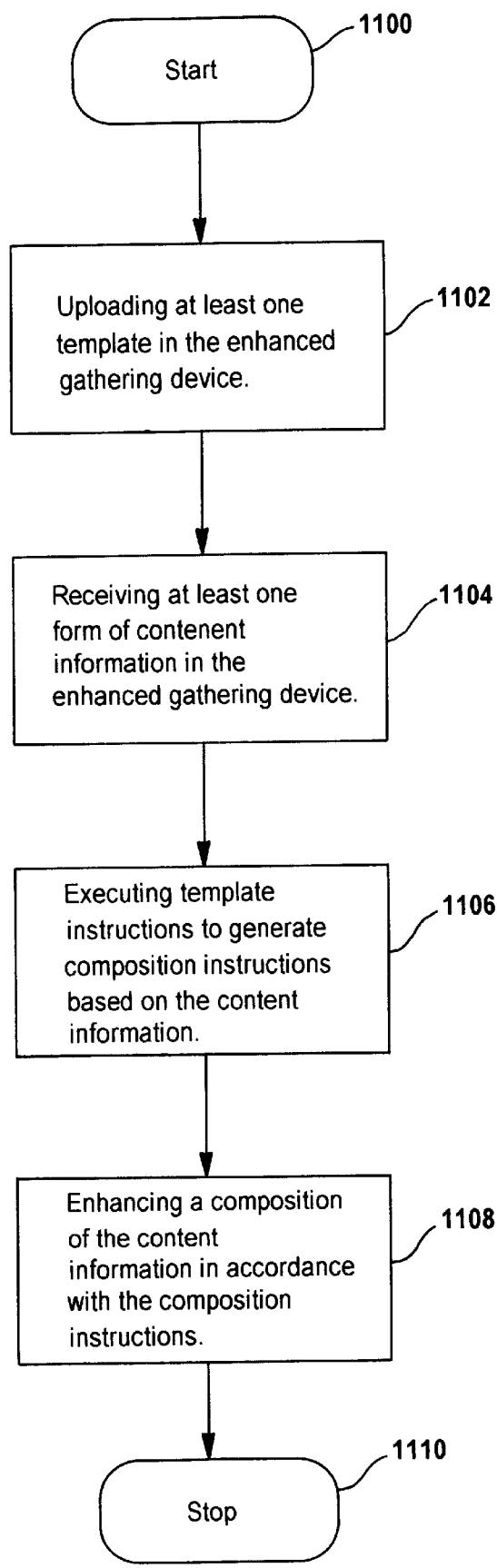
FIG. 11 is a flow diagram of a process of enhancing gathered content information, in accordance with the invention.

FIG. 11 is a flow diagram illustrating the general process of enhancing gathered information in accordance with the present invention. The process commences at step 1100. In step 1102, at least one template is uploaded in the enhanced gathering device, the template usually being selected by the user. In step 1104, at least one form of content information is received by the gathering device. In step 1106, template instructions from the uploaded template are executed to generate composition instructions based on the received content information. In step 1108, the composition of the content information is enhanced in accordance with the composition instructions. In step 1110, processing terminates. Preferably, the method further involves the step of storing the enhanced content information in a storage means and optionally downloading to an external device. It is particularly desirable in step 1108 that the content information is enhanced at least partly on the basis of the content information itself. By interpreting the content information itself, dynamic, customised enhancement is enabled.

In a preferred embodiment, some of these tasks are automated. A decision on which content to gather, and with what composition, is made by the gathering device 100 on the basis of the currently selected template. For example, in a specific first embodiment of the present invention described hereinafter, the template is used to decide from predetermined conditions that a portrait view of an image is preferred over a landscape view, and so cropping of the image to a portrait view is automatically performed if necessary.

Other features and advantages of the present invention are set forth in greater detail hereinbelow.

First Embodiment

Referring to FIGS. 2 to 7, the present invention can be implemented in the form of a digital still camera 202 having a gathering device 100 in accordance with that shown in FIG. 1 built in. The content collecting unit 101 takes the form of an optical lens system and associated CCD, as is typical for such cameras, and can also include distance measuring sensors, light intensity determination devices, focus detection devices and position locating devices (e.g. a Global Positioning System (GPS) apparatus). These sensors and devices gather image data, and metadata such as the location where the photograph was taken.

The user interface unit 105 for the digital still camera 202 takes the form of a liquid crystal display (LCD) 203, which is touch sensitive to enable user input. Alternatively other data input means, such as buttons, can be used.

Figure 2:
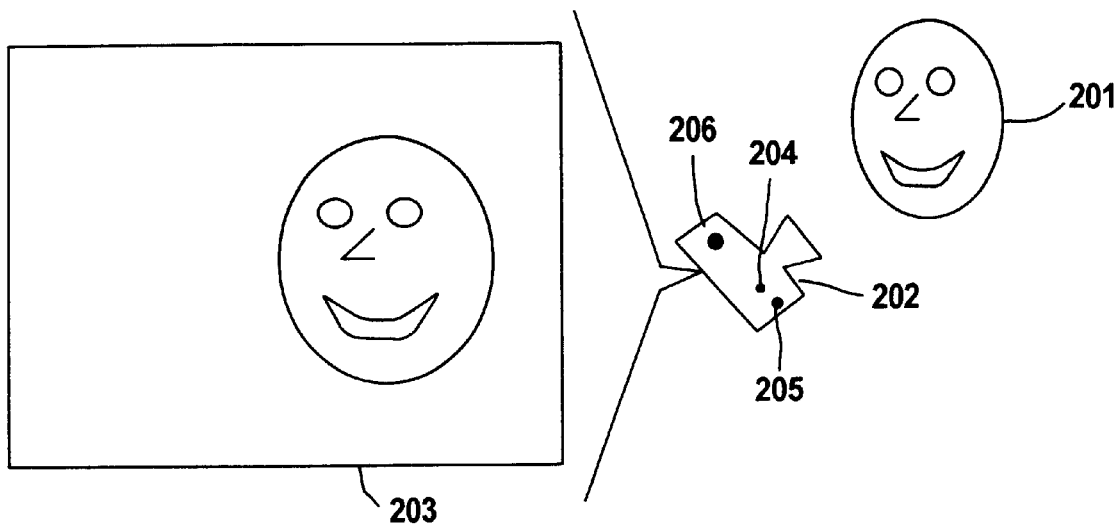
FIG. 2 is a representation of digital still camera, comprising the enhanced gathering device of FIG. 1 in accordance with a first embodiment.

FIG. 2 is a schematic representation of the digital still camera 202, used in taking a picture of subject matter 201. The LCD 203 associated with the digital still camera 202 is used to display an image to be recorded. In use, the user can record an image by pressing a shutter button 206 or can enter a template mode by pressing a mode template button 204. The user can exit the template mode by pressing the mode template button 204 a second time.

Figure 3:
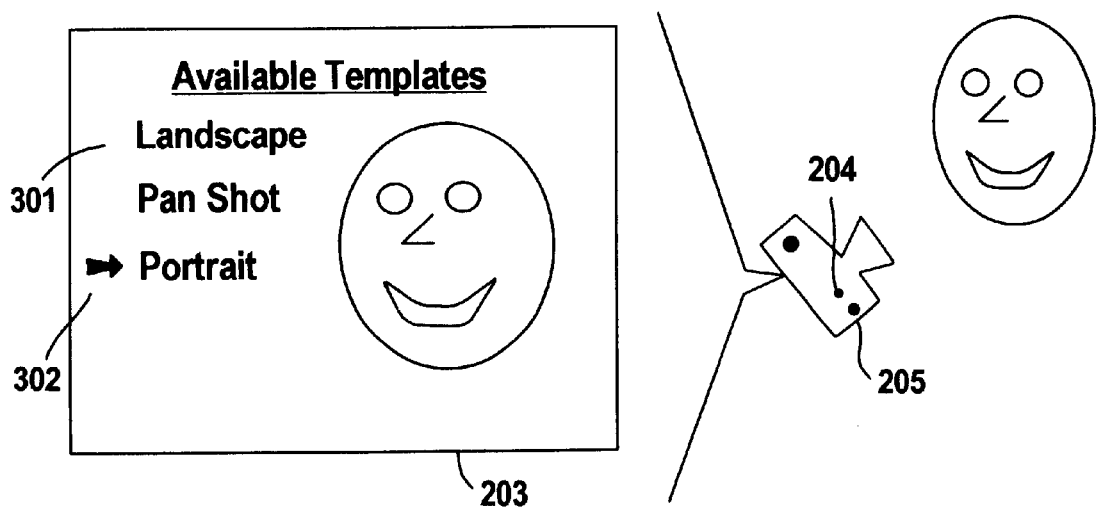
FIG. 3 is a "Template Selection" mode of the digital still camera of FIG. 2.

Turning now to FIG. 3, initially pressing the mode template button 204 causes a list of available templates 301 to be displayed on the LCD 203. In this example, the templates include a landscape template, a pan shot template and a portrait template, which were uploaded to the gathering device as described above. A selector button 205 is used to navigate through the available options, and to select the desired template. A selection arrow 302 displayed on the LCD 203 indicates the current template selection.

Once a template is selected, the image displayed on the LCD 203 is periodically or continually analyzed by the processing unit 104. The results of the analysis are used by the template to guide the user and make suggestions in relation to composition. In the example shown, the portrait template requires that for best results the subject matter 201 should be generally centred and occupy at least a predetermined percentage of viewing field to be captured.

Figure 4:
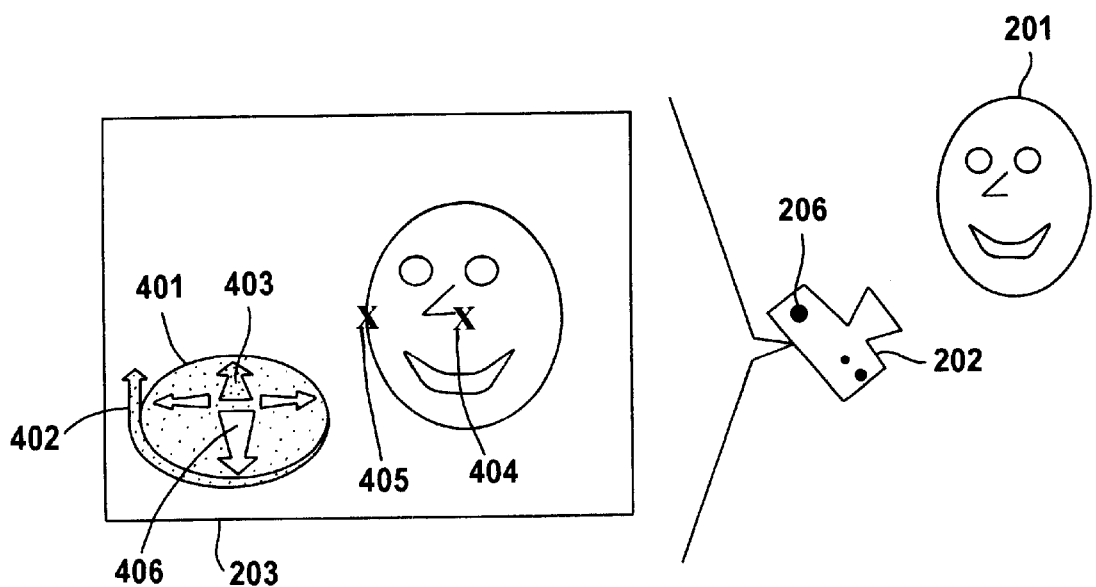
FIG. 4 illustrates a mode of the digital still camera of FIG. 2, in which composition features. "Orientation Guidance" and "Alignment" of an image to be gathered are shown.

Turning to FIG. 4, once a template has been selected, the LCD 203 shows a number of elements, including a positioning indicator 401, a line up marker 404 and a centre marker 405. These elements, although visible on the LCD 203, are not captured as part of any image when the user depresses the shutter button 206. Depending upon the implementation, the elements can appear on a portion of the display in which the image is not displayed, or can be composited over the image. In the latter case, it is preferred that the elements be at least partially transparent so that the image is not completely obscured.

The current status of the positioning indicator 401, the line up marker 404 and the centre marker 405 are associated and stored with the corresponding image as metadata for later use or evaluation. For example, when capturing the image, the user might not correctly align one or more of the markers 404, 405 or positioning indicator 401. If the content collecting unit is capable of gathering a larger view of an image than suggested by the markers and positioning indicator, then the information part of the metadata can be used to suggest a preferred print area for the image during subsequent viewing and processing of the image.

The position indicator 401 provides suggested zoom information to the user. A "zoom in" arrow 403 indicates that it is considered desirable to zoom in on the subject 201 of the image to improve the composition of the proposed photograph. Correspondingly, a "zoom out" arrow 406 can flash to indicate that it is desirable to zoom out from the subject 201 to improve the composition. Alternatively, the subject 201 or the camera 202 can be moved closer together or farther apart to achieve an effect substantially similar to zooming.

Figure 5:
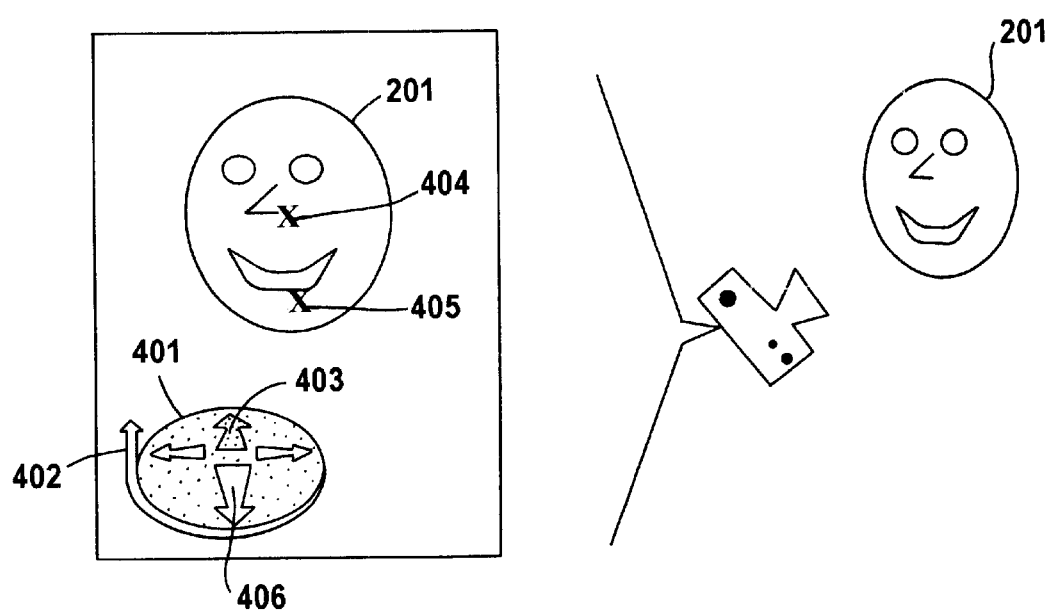
FIG. 5 illustrates an alternative mode for the mode of the digital still camera of FIG. 2, showing another composition feature and "Zoom Guidance"

The position indicator 401 can also advise the user to orient the camera 202 vertically by flashing a peripheral arrow 402 on the indicator. As illustrated in FIG. 5, the user rotates the camera 202 into the suggested vertical orientation so that the peripheral arrow 402 no longer flashes, thereby indicating a correct orientation for improved composition. At this stage, as illustrated in FIG. 5, the markers 404, 405 are still not aligned, and the "zoom in" arrow 403 is indicating that a zoom in is desired.

The centre marker 405 and the line up marker 404 are provided for a variation on the first embodiment in which the enhanced capture device 100 is capable of analysing the content information of the image and substantially detecting an approximate position of the subject 201 in the image. The detection of the approximate position of the subject of the image need not be performed by analysing the content information and can be determined by other techniques known to those skilled in the art without departing from the scope or spirit of the invention. For example, the position of the subject in the image can be determined by detecting which portion of the image a user is looking at from a relative position of the user's eye pupils in relation to the image being observed.

In this variation of the first embodiment, the centre marker 405 is placed at the centre of the visible area, while the line up marker 404 is placed at the centre of a detected subject. Since the line up marker attempts to follow the subject 201, a user can manipulate the line up marker 404 and centre marker 405 by moving the camera 202.

The various position indicators and markers need not take the form of an "x", as is shown in the present embodiment. Depending upon the embodiment, any suitably shaped marker can be used. In one preferred alternative embodiment, one or more of the indicators or markers can take the form of a circle or oval which roughly corresponds with the shape of the subject (eg, a face) to be captured. In this way, the user can move, zoom and change the orientation of the camera until the subject is positioned within the circle or oval, thereby to improve the composition of the resultant photograph.

Figure 6:
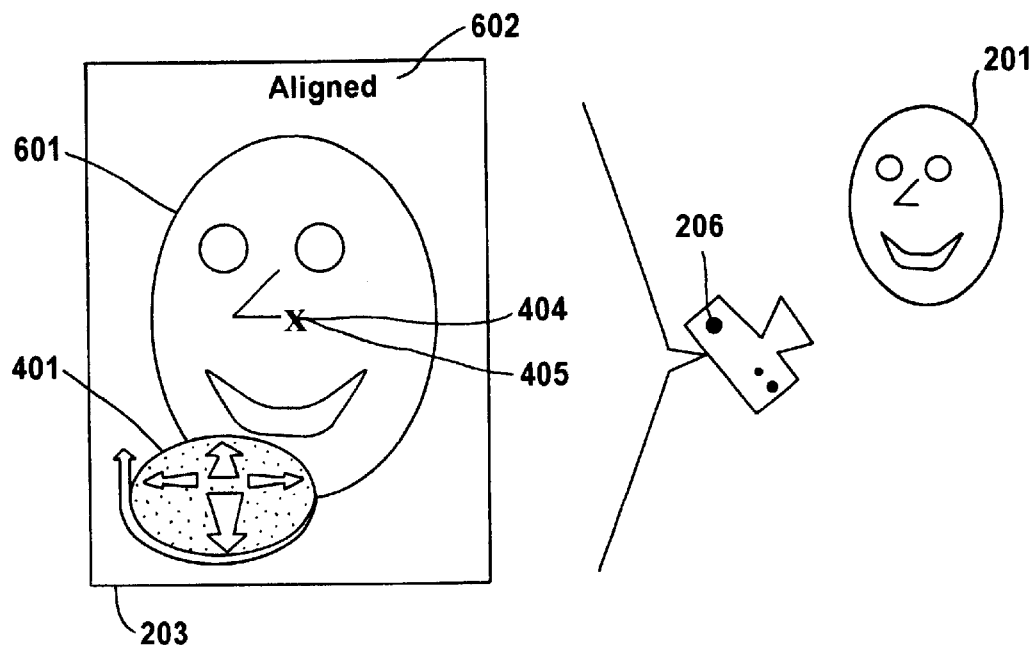
FIG. 6 illustrates an example of an enhanced image composition in accordance with the present invention.

Turning to FIG. 6, the user has centred and zoomed in on the subject matter 201 of the image correctly, and all of the arrows on the position indicator have ceased flashing. For further convenience, in the embodiment shown, there is provided an indicator 602 of alignment of the LCD 203. The position indicator having no arrows displayed (and, in a preferred embodiment, by the indicator 602 being on) the composition of the image is considered by the camera 202 to correspond with that suggested by the selected template. The user can then activate the shutter button 206 to record the image.

Figure 7:
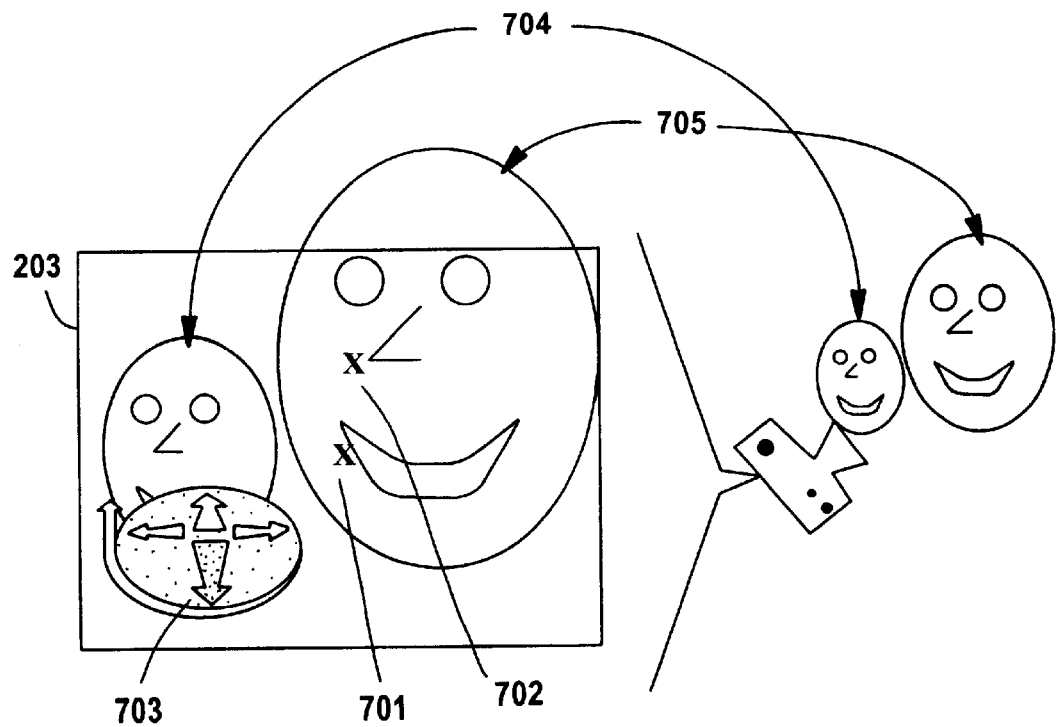
FIG. 7 is an example of a viewfinder display of a digital camera such as that shown in FIG. 2, for a portrait of two subjects in an image to be captured.

FIG. 7 shows the digital still camera 202 operating in portrait template mode, in which a plurality of objects 704 and 705 are to be captured. The template attempts to optimise a best fit of the objects 704, 705 into a visual area of the image. Preferably, a geometric centre of a bounding box containing the objects is used as an align marker 702 location, and a geometric centre of the visual area of the image (i.e. the image visible in LCD 203) is used as a centre marker 701. The object 705 is partly outside the visible display area 203, and so the position indicator recommends a zoom out by flashing the zoom out arrow 406. As with the previous situation, the user adjusts the zoom, orientation and other composition aspects until the template's suggestions have been satisfied. The photograph can then be taken.

A substantially similar description applies to the landscape and pan shot templates. The landscape template is generally used for photographing landscape scenery and the pan shot for panoramic wide view shots.

For the sake of conciseness, the templates have been described as providing only relative limited numbers and types of composition suggestions, such as orientation and zoom. However, it will be appreciated that the invention is not limited to these particular aspects of image composition. Other aspects include suggesting lighting arrangements, best angle for lighting in a photographic studio setting, and camera focus advice. The camera focus advice can be by way of suggesting camera settings to achieve a foreground focus and background defocus, or vice versa. It is preferred that these suggestions are made dynamically on the basis of the actual content information being viewed.

The templates attempt to provide advice to the user, from the content information available, which could correspond with that which might be given by one skilled in the art of photography. Accordingly, the preferred embodiment provides suggestions on camera orientation, zooming and positioning of subject matter to provide guidance to the amateur photographer who does not have the skills necessary to produce a quality photograph, or a photograph of a predetermined style.

The templates are implemented in code with the use of a programming language as previously described. Pseudocode for a portrait template is included in the accompanying Appendix A. The main routine of the pseudocode executes and runs while the digital still camera 202 is powered up, and analyses the image formed on the LCD 203 in the manner described above As described previously in relation to FIG. 3, when the user has pressed the template mode selection button 204, the available templates are displayed. The user can select a desired template, with the selector button 205 and then exit the template selection mode. When the selection has been made, a software routine such as that represented by the pseudocode contained in Appendix A checks for various conditions that are required for zoom and orientation of the image in the viewfinder.

The subroutine SetUpForTemplate returns a TRUE boolean value when the image is aligned and the main program "Void Main()" will flag that the image is aligned.

As previously described, additional information such as metadata can be recorded and associated with an image. Examples of this additional information include date, time, actual zoom used, shutter speed, aperture, that the still is a portrait of a person, the number of people in the shot and the centre of each of their faces, as well as the geometric centre of the faces as a group.

Second Embodiment

A second embodiment of the present invention is similar to the first embodiment, except that the gathering system 100 forms part of a video camera. Templates are provided for giving advice on features including zoom, pan, composition and directing (in the sense of artistic, aesthetic of compositional film direction) of a video clip. For example, a plurality of uploadable templates can be provided to a user when purchasing the camera, including templates for directing a wedding scene, a real estate agent's home selling promotional clip, and a country holiday scene which may include suggestions as to sights and wonders of the world that are recommended for video recording. For instance, the user taking a trip to Egypt can upload a template of preferred sights of North Africa, or Egypt specifically, to the memory stage unit 103. Besides performing the other functions herein described, the template may further suggest recommended sights and places of interest which are considered worthy of videotaping. In the Egyptian example, one suggestion might be the Pyramids or even particular pyramids and specific aspects thereof.

As a further example, reference is made to an uploadable, "wedding" template for directing videotaping of a wedding. A user intending to make a video recording of a relative's wedding can upload the wedding template from the general purpose computer 107 to the video camera (not shown) via the communications port 106. The wedding template is stored as compiled code in the memory storage means 103, while features common to the wedding and other uploadable templates form part of the ROM 108. Common features may include details of maximum and minimum zoom settings available for the particular video camera, aperture settings possible and other features that may be common to a majority of templates for the video camera.

When the user starts to record a wedding scene using the video recorder, the wedding template is activated and advises the user as to the particular shots should be taken, and in which order, to produce a video clip which would correspond (after editing, if necessary) with a relatively professional video recording.

Preferably, the prompts are given chronologically. For example, when using the wedding template, the user is prompted to take a shot of the groom entering the church, the groom standing at the alter, the bride leaving the car and making her way up the steps of the church, the bride walking down the aisle and so on. Further, the user is also advised on more technical matters of video composition, such as zooming, panning, lighting and audio. For example, if the user zooms too quickly when recording the bride walking down the aisle, a "slow down" indicator is flashed in the viewfinder of the video camera. Also, in specific scenes such as this, the video camera can attempt to recognize what is being recorded and provide appropriate dynamic compositional suggestions. For example, when the bride is walking down the aisle, the system can attempt to recognize the aisle by means of camera movement and the existence of parallel lines representing pews. The bride can also be recognised (as being the bride) and suggestions made as to the most appropriate use of the camera, including panning and zooming, given the user's proximity and position with respect to the bride.

Preferably, the user uses a series of menu based commands displayed on a viewfinder (equivalent to LCD 203 in the first embodiment) to confirm which section or portion the user is currently being recorded. The user uses control buttons to indicate the section that is about to be, or has just been, recorded. For example, in the wedding template, the user is given a display of a number of sections, or portions, which is suggested for recording, including an "Aisle" section for when the bride is walking down the aisle. The user uses control buttons or a touch screen to indicate that the aisle section is about to be recorded (or has finished being recorded). This indication is recorded as metadata for the corresponding portion of the video clip.

For example, information designating a section of the videotaped recording of the wedding scene as "bride walks down aisle" is recorded as part of the metadata for the corresponding scene. When editing the recorded wedding scene, preferably using an external device such as the general computer 107 including hardware a software video-editing components, the metadata associated with the videotaped wedding can be used to identify various scenes within the wedding.

Third Embodiment

A third embodiment of the present invention is a sound mixing desk incorporating a content gathering device. A sound mixing desk is typically used for gathering musical content from a number of different channels, applying various effects and filters to individual and/or groups of channels, then "mixing" the channels into one or more output channels that are recorded or used to drive amplifiers for transmission to an audience.

For simplicity, a relatively simple two-channel interface sound mixing desk is described. The mixing desk is implemented using a computer to display controls, analyse content, provide user feedback, and to control filters, analysers, effects units and other hardware items.

Figure 8:
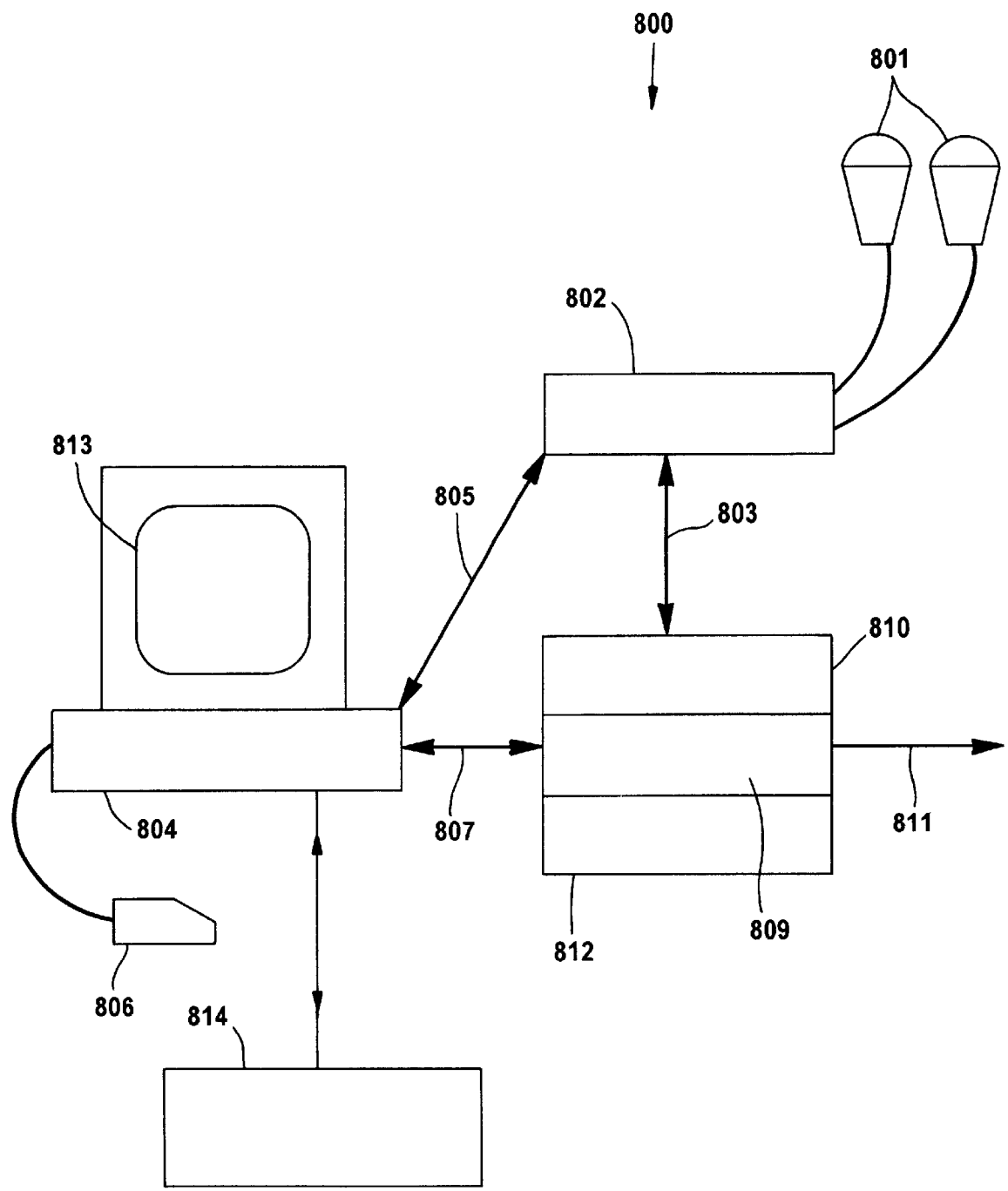
FIG. 8 is a block diagram of an alternate embodiment of the present invention.

Referring to FIG. 8, there is shown a sound mixing desk system 800 comprising: a plurality of content gathering sensors in the form of sound transducers 801; a gathering device 802 into which signals from the transducers 801 are fed in two channels; a plurality of effects units, filter banks and analysers 810 connected to the gathering device 802 by data link 803; an output amplifier 809 with at least one output 811; playback devices 812 including a Compact Disc player, reel to reel tape or cassette tape unit connected to the gathering device 803; and a general-purpose computer system 804 for operating and controlling the other components.

Information gathered by the audio transducers 801 and the other peripheral devices 812 is passed to the enhanced capture device 802, which processes the gathered information according to a selected template. One or more templates of interest can be uploaded to the enhanced gathering device 802 via a data link 805, for storage therein.

The enhanced gathering device 802 comprises substantially the same components as illustrated in FIG. 1, although it is configured for use with audio data from the audio transducers 801, rather than with video or still image data. In the embodiment of the sound mixing desk 800 shown, the user interface unit of FIG. 1 is not a separate unit, and instead is implemented on the general-purpose computer system 804.

The information gathered by the sensors 801 and other peripheral devices 802 forms part of the content information. The content information preferably includes metadata such as time, date, recording duration length, musical style and title of track, which can be added to the content information in accordance with instructions by a selected template.

Although a plurality of templates will usually be uploaded to the enhanced gathering device 802, a single template selection can be made by manipulation of a mouse 806 forming part of the computer 804, in conjunction with an external display 813 and keyboard 814 as necessary. In the preferred form, the selection is made using a menu or icon driven display.

The content information gathered is passed via a communication link 803 from the enhanced gathering device 802 through the plurality of effects units, filter banks and analysers 810, to the output amplifier 809 and output 811.

Content information is passed to the computer 804 through the data link 805, and data about the content information is displayed for the user on the display device 813. Preferably, the content information is further analyzed by a central processing unit which extracts data to be displayed. Alternatively, the content information is analysed by the enhanced gathering device and only relevant display data is transmitted via link 805 to the computer 804.

The user can adjust various settings through manipulation of the mouse 806 and keyboard 814. The various settings are conveyed on a bi-directional link 807 as control signals to alter parameters of the amplifier 809 and the plurality of effects units, filter banks and analysers 810 to correspondingly produce desired modifications to signal at the output 811. The bi-directional link 807 preferably also carries signals generated by a number of devices, including the plurality of effects units, filter banks, analysers 810, the output amplifier 809 and the playback devices 812, relating to current status and/or playback content information of the various playback devices 812 if required.

A user can alter preference and default settings through the computer system 804. The default settings are generally dictated by the type and/or combination of components connected to the sound mixing desk. For instance, different choices of audio transducers or playback devices may require different default settings. Preference settings generally provide a manner of customising a sound mixing system to user preferred settings. Both preference and default settings are stored in non-volatile memory forming part of the computer system 804.

An example of an uploadable template is described below with reference to a musical group mixing template. Such a template provides advice to the user in relation to mixing (and, if desired, recording) the sounds of a particular type of musical groups, such as a string quartet, a rock and roll band, a heavy metal band and a classical orchestra. Upon selecting and executing the appropriate musical group template, the user is prompted to select a music style and nominate a venue size (i.e small hall, outdoors, studio etc.). Preferably, the user is further prompted to identify which channels (or associated sensors) are to used to gather information (sound signals) for instruments and which sensors are for vocals. The musical group mixing template then produces a recommended list that provides best allocation of available audio transducers (i.e., microphones) for each channel.

Further, the user may select a "testing" option, in which the musical group mixing template analyses the content information and advises whether any of the sensors are picking up undesirable reflections from surrounding objects or surfaces, or are being driven into overload. If such problems are detected, the template can either nominate a solution (e.g., to re-allocate or reposition the microphones) or attempt to electronically compensate for the distortion through the effects and filters available. Similarly, the musical group can do a test performance, during which a sound level setting is determined for use as guide during the actual performance.

As data is collected by the sensors 801, the enhanced gathering device 802 extracts content information and provides it to the computer 804. The computer 804 generates and sends compensation control signals in relation to the filters and effects on each channel.

For example, a user can select a "heavy metal" music template with a high distortion level to the vocal channel. Boosting of the top end frequencies is suggested to the user, and is preferably implemented automatically in the absence of user override.

However, if the user selects a "classical" music template, then all the channels are biased to a relatively "flat" spectral setting. That is, only minimal effects are added to the channels through the effect units or filter banks, so that the instrument sounds are reproduced as faithfully possible.

As previously described, each template provides advice and suggestions to the user which could otherwise be provided by one skilled in the art. In the present example the art is the art of sound mixing, and so the advice provided can relate to, for example, echo, sound reflection, reverberation, tempo, relative channel amplitudes, panning and parametric or graphic frequency manipulation.

Whilst so far only briefly described in relation to the second embodiment, an optional preferred feature of the templates applicable to each of the above described embodiments is that of providing a check list of events or actions that a user can "tick off" in respect of predetermined events or actions. For instance, in the digital still camera example described above, a check list of predetermined shots is provided to a user through the user interface. Before (or after, depending upon the implementation) taking a particular photograph, the user ticks off a corresponding shot from the check list. For example, the digital still camera can execute a birthday party template which includes a birthday party check list. The check list is displayed on the user interface and can include the following suggested photograph opportunities:

birthday party games;
blowing out of the candles; and
making a toast to the birthday person.

The user takes photographs during the birthday party. If a particular photograph taken coincides with an entry in the check list, that entry is "ticked off" by the user selecting it via the control buttons. Upon selecting the entry in the check list, metadata is generated and associated with the photograph. This metadata information can be utilised, for example, when the photograph (or image) is downloaded to a general purpose computer, to put together a photo-album of the birthday party. Software running on the computer extracts the captured photographs, along with any associated metadata, and uses the metadata to arrange the photographs in the correct order and context to automatically generate a "virtual" photo album. The virtual photo album can include such additional features as appropriate music, borders, graphic art and text relevant to each of the photographs.

A plurality of check lists can be provided with each template to assist the user in determining which photographic shots would provide good composition when placed adjacent each other in a photographic album.

In the example of the sound mixing desk, a substantially similar check list for music can be provided upon which the user can indicate when a particular event has been captured or gathered. For example, the check list could be for pieces of music, or can relate to checking particular mixing characters. Again, corresponding metadata is generated and associated with the event. The corresponding metadata can be a simple identifier for the event or a more complex description of the event as may be desired for future manipulation or editing thereof.

As well as providing template instructions which generate composition preferences based on the gathered content information, the template can contain additional information such as the order in which to implement or make each composition suggestion, the encoding or compression technique to be used with the content information, and which metadata is to be recorded.

Figure 9:
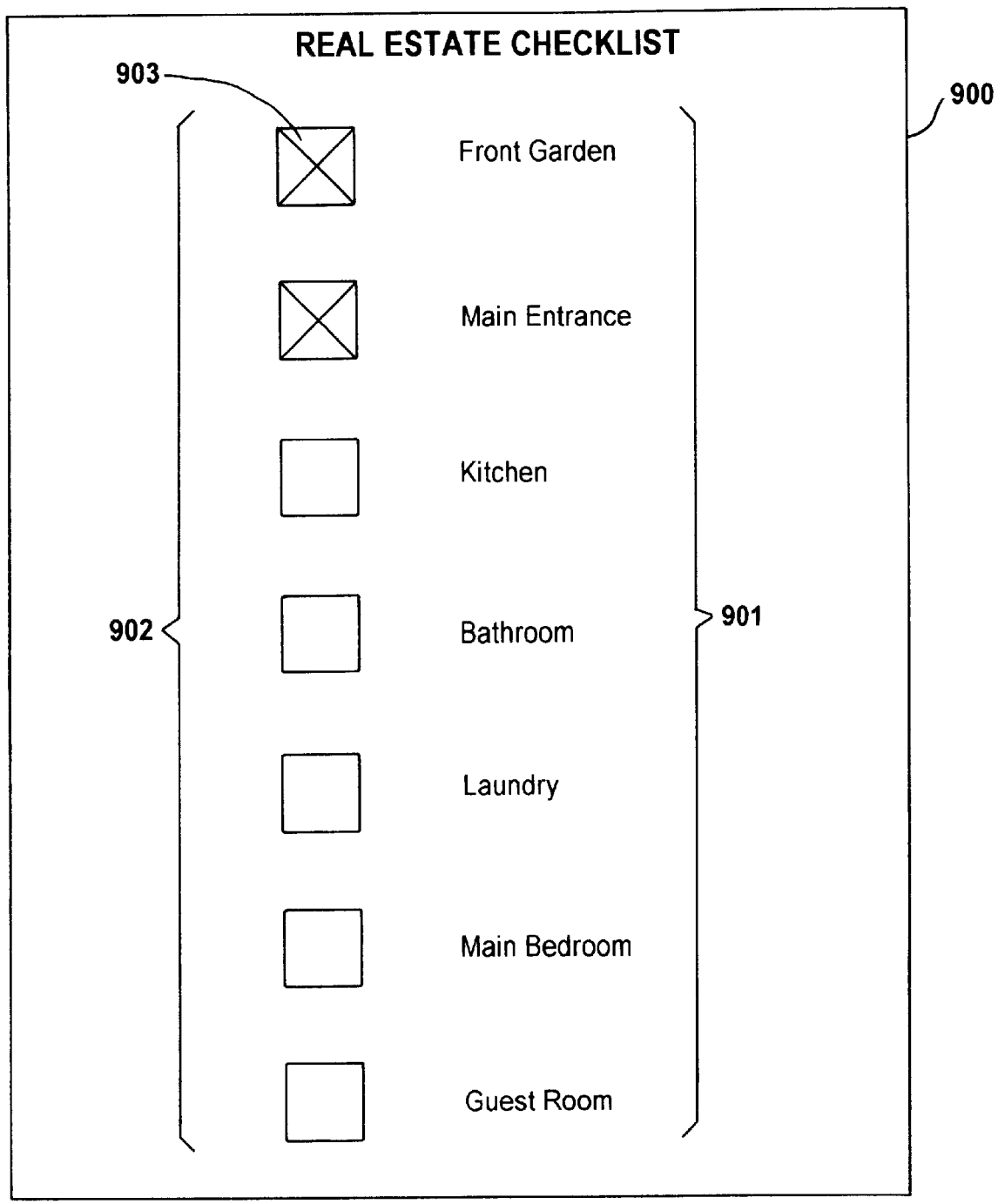
FIG. 9 is an example of a check list associated with a template.

Referring now to FIG. 9, there is shown another example of a check list displayed on the user interface display (e.g. viewfinder 203 of the digital still camera of FIG. 2 or the viewfinder of the video camera of the second embodiment hereinbefore described). The check list 900 is associated with a real estate template which is uploaded into the enhanced gathering device 100 as previously described with reference to the first or second embodiment of the present invention. The real estate template in this case makes suggestions to the user (typically a real estate salesperson) regarding the suggested images required to compose a good presentation. The real estate template can, as an optional function, provide a check list comprising: description fields 901 which provide a brief description of a recommended photograph (or video clip in the case of the video camera) to be recorded; check list indicator fields 902 provided for marking off each corresponding image (photograph) recorded; and check list marker 903 to indicate which of the recommended images have been recorded.

The check list marker 903 is typically added by the user, through an available user input interface, preferably when the recommended image has been recorded. The real estate template, upon checking off the items of the check list, generates metadata and associates the metadata with the corresponding image of the check list. Preferably, the metadata is an encoded description of the image to which it is associated. Further, the metadata can include such characteristics as time, date, location etc.

Figure 10:
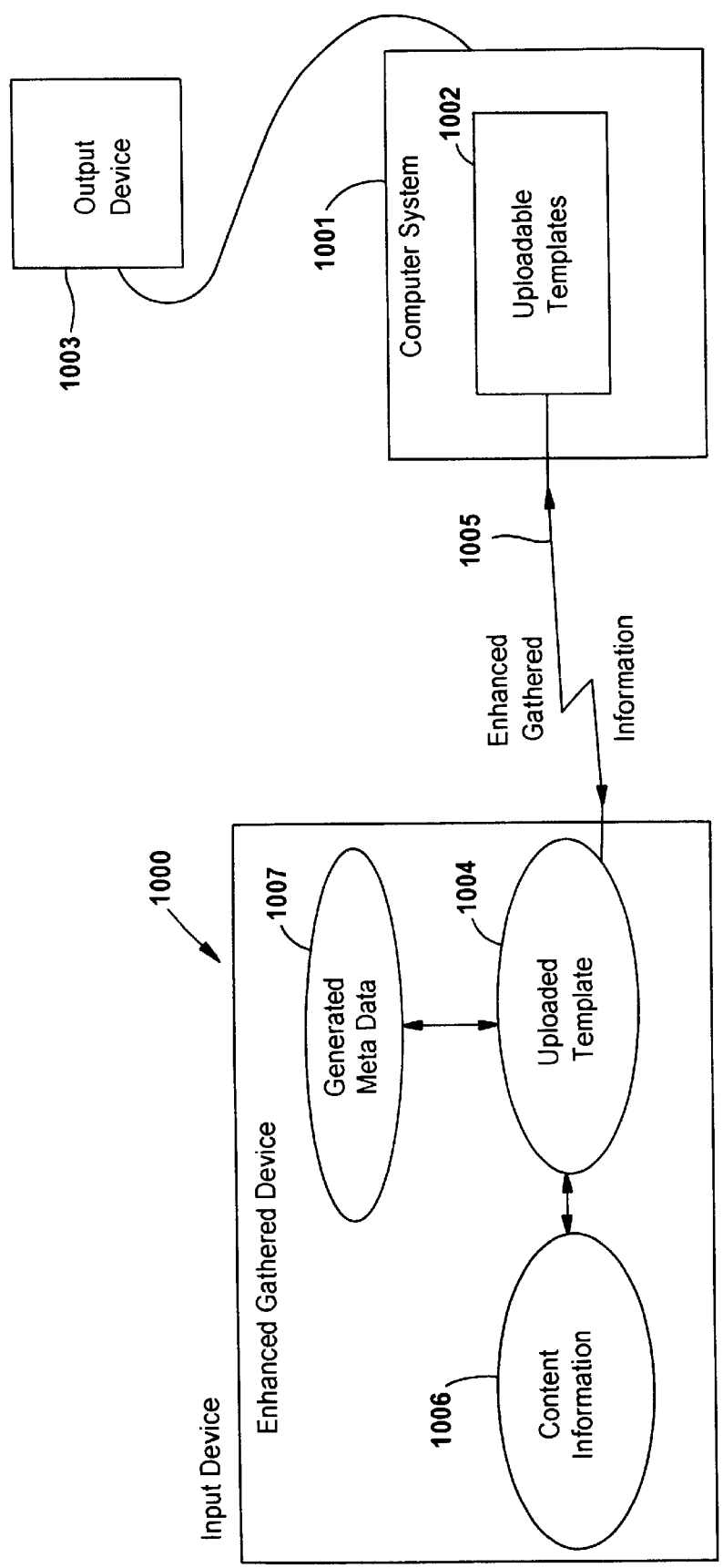
FIG. 10 is a block diagram of information flow in accordance with the present invention.

Referring to FIG. 10, there is illustrated a block diagram of information flow comprising uploadable templates 1002 stored on a computer system 1001. The uploadable templates 1002 are uploadable from the computer system 1001 via a bi-directional communication link 1005 to a content gathering device in the form of input device 1000. The templates are stored as uploaded templates 1004 in the input device.

Content information 1006 is gathered by the input device 1000, and metadata 1007 is generated by at least one of the uploaded templates 1004. The generated metadata 1007 can simply be a description of the content information determined either by a user response to a check list or from the template by analysis of the content information 1006.

The template associates the generated metadata 1007 with a corresponding part or all of the content information 1006. For example, in the case of the real estate template, the content information can comprise an image from the check list 900 of images suggested by the real estate template. The corresponding metadata generated for the image can be based upon features including: content analysis directed to orientation, average colour, average brightness, dominant colours, predetermined patterns, and statistical analysis in spatial, time or frequency domains identified in the content information; user preferences including colour and arrangement of information; and device specific features including a current state of hardware components and predetermined formatting of information for downloading to various output devices.

The gathered information, which includes content information and metadata, is downloaded to an external device. In the present example, the external device is the general purpose computer system 1001 as previously described.

Alternatively, the external device can be a dedicated external device capable of receiving the gathered information. Such dedicated devices include: a printer device, a display device (e.g. cathode ray tube, CTR or Liquid Crystal Display (LCD)), a photocopying device, or an acoustic recording device. In each case, the dedicated device is configured to receive the gathered information and provide an output, or to store the information, according to predetermined preferences. Without departing from the scope of the spirit of the present invention, the external device can be, for example, a video cassette tape for recording and storage of the gathered information to be used at a latter stage in composing a final output.

Preferably, an uploaded template 1004 formats and arranges the gathered information in accordance with predetermined settings, or formats the gathered information for compatibility with the type of external device to which it is to be downloaded.

The process of enhancing gathered information in accordance with the embodiments of the invention can be implemented in software, readable and executable by a processing device such as a microprocessor, and recorded on a computer readable recording medium. The recording medium can be magnetic or optical storage memory such as a hard or floppy drives, magnetic tape, CD-ROM, magneto-optical disk, a memory card, read-only memory, or any other type of storage device with sufficient capacity. Also, the software can reside on another computer system assessed through a computer network or across the Internet.

Although the invention has been described with reference to a number of particular embodiments, it will be appreciated by those skilled in the art that the invention can be embodied in many other forms without departing from the scope or spirit of the invention.

APPENDIX A

```
Psuedo Code
//Portrait Template
Boolean SetUpForPortrait(Boolean UI_Flags[] image)
{
    Boolean Result = TRUE
    // Assume only called IF 0 < numFacesDetected < 4
    IF IndequateMarginAroundGeometricCentre(image) THEN
        UI_Flags[ZOOM_OUT] = TRUE
        Result = FALSE
    ELSEIF ToMuchMarginAroundGeometricCentre(image) THEN
        UI_Flags[ZOOM_IN = TRUE
        Result = FALSE
    ENDIF
    IF ((FacesBoundingBoxTallerThanItIsWide(image) AND
        CameraOrientation Equals LANDSCAPE) OR
        (FacesBoundingBoxWidererThanItIsTall(image) AND
        CameraOrientation Equals PORTRAIT)) Then
        UI_Flags[CHANGE_ORIENTATION] = TRUE
        Result = FALSE
    ENDIF
    IF (FacesBoundingBoxCentred(image) EQUALS FALSE THEN
        UI_FLAGS[CENTRE_BOUNDINGBOX] = TRUE
        Result = FALSE
    ENDIF
    RETURN Result
}
Void main()
Boolean UIFlags(CONST_NUM_UI_FLAGS)
ImageType image
TemplateType templateSelected
WHILE PoweredOn
    IF MenuButtonPressed() Then
        templateSelected = DisplayAvailableTemplates()
    ENDIF
    // Get the image that the camera is looking at
    GetImageInViewfinder(image)
    // Check for cases for which there is a template
    IF templateSelected
    EQUALS CONST_PORTRAT_TEMPLATE THEN
        IF SetUpForPortrait(UIFlags, image) EQUALS TRUE THEN
            UIFlags[PICTURE_ALIGNED] = TRUE
        ENDIF
    ELSEIF . . .
        . . . Other checks for other templates
    ENDIF
    UpdateUI(UIFlags)
END WHILE
}
```

The claims defining the invention are as follows:

1. A content gathering apparatus for gathering predetermined forms of content information, said apparatus including:

content collecting means for gathering content information, said content information including at least audio data;

template storage means for storing at least one template, each template including a plurality of template instructions; and processing means for executing the template instructions, wherein the template instructions when executed provide composition instructions for enhancing composition of the content information collected.

2. A content gathering apparatus according to claim 1, further comprising a user interface, wherein the composition instructions are provided as suggestions to a user of the content gathering apparatus via said user interface.

3. A content gathering apparatus according to claim 1 or 2, wherein the composition instructions are implemented by the content gathering apparatus in the absence of countermanding instructions.

4. A software storage medium bearing content information which has been composition enhanced by means of the apparatus defined by claim 3.

5. A content gathering apparatus according to claim 2, wherein said composition suggestions include one or more of the following types of advice:
light arrangements;
focus
best angles;
orientations;
zoom;
pan.

6. A content gathering apparatus according to claim 1, further including content information storage means for storing the gathered content information.

7. A content gathering apparatus according to claim 1, further including communication means for uploading the at least one template to the gathering apparatus.

8. A content gathering apparatus according to claim 1, wherein the template instructions are coded machine instructions for the content collecting means.

9. A content gathering apparatus according to claim 8, wherein the content collecting means receives said coded machine instructions and accordingly alters at least the composition of the gathered content information.

10. A content gathering apparatus according to claim 1, further comprising a user interface, wherein the user interface includes input means for allowing user input in response to display of information.

11. A content gathering apparatus according to claim 1, wherein additional data associated with the gathered content information is collected, said additional data being encodable as metadata to be associated with the gathered content information.

12. A content gathering apparatus according to claim 11, wherein the additional data is selected from the group consisting of the following pieces of information in relation to the content information gathered:
date and time;
location;
apparatus orientation information;
apparatus setting information; and
information on user selected options.

13. A content gathering apparatus according to claim 11, wherein execution of the template instructions is dependent on said additional data.

14. A content gathering apparatus according to claim 1, the content gathering apparatus being selected from the group consisting of:
a still camera;
a video recorder;
an image capture device;
an audio recorder;
an audio mixer; and
an audio capture device.

15. A content gathering apparatus according to claim 1, wherein the instructions are generated at least in part on the basis of the content information gathered.

16. A content gathering apparatus according to claim 1, wherein template instructions associated with at least a plurality of templates are stored in a read only memory means of said content gathering apparatus.

17. A content gathering apparatus according to claim 1, further including input means for allowing user input in response to the composition instructions, and wherein the data input via said user input means is associated with the collected content information.

18. A content gathering apparatus according to claim 1, wherein the template instructions when executed provide composition instructions in relation to an order in which to collect the content information.

19. A content gathering apparatus according to claim 1, wherein the template instructions when executed provide composition instructions in relation to encoding of the content information collected.

20. A content gathering apparatus according to claim 1, wherein the template instructions when executed provide composition instructions in relation to metadata to be associated with the content information collected.

21. A content gathering apparatus according to claim 1, wherein the content information includes a sequential plurality of images.

22. A method of gathering predetermined forms of content information using a content gathering apparatus, including the steps of:
providing at least one template to the content gathering apparatus, the at least one template including a plurality of template instructions;
capturing content information with the content gathering apparatus, said content information including at least audio data;
executing the template instructions to generate composition instructions based on the captured content information; and
composing said content information in accordance with the composition instructions.

23. A method according to claim 22, further including the step of storing the enhanced content information in a storage means associated with the content gathering apparatus.

24. A method according to claim 22 or 23, further including the step of downloading the composition enhanced content information to an external device.

25. A software storage medium bearing content information which has been composition enhanced by means of the method of any one of claims 22 to 24.

26. A software storage medium bearing content information which has been composition enhanced by means of the method of claim 24.

27. An apparatus including a readable storage medium having a computer program recorded therein for enhancing gathered content information, said apparatus including:
means for uploading at least one template from the readable storage medium, the at least one template including a plurality of template instructions;
means for gathering content information;
a computer processor for executing said template instructions, thereby to generate composition instructions based on the content information, said content information including at least audio data; and
means for composing said content information in accordance with the composition instructions.

28. An apparatus according to claim 27, further including means for storing the enhanced content information on a storage means.

29. An apparatus according to claim 28, further including means for downloading the enhanced content information to an external device.

30. A software storage medium bearing content information which has been composition enhanced by means of the apparatus defined in any one of claims 1 to 3, 6 to 12, 14, or 27 to 29.

31. A system for enhancing composition of gathered content information, the system including:
   content collecting means for gathering content information, said content information including at least audio data,
   template storage means for storing at least one template, each template including a plurality of template instructions; and
   processing means for executing the template instructions, wherein the template instructions when executed provide composition instructions for enhancing composition of the content information collected.

32. A system according to claim 31, further including a computer for storing a plurality of templates for selective uploading to the template storage means.

33. A system according to claim 32, wherein the content collecting means, template storage means, processing means and a user interface are implemented on a content gathering apparatus.

34. A system according to claim 33, the user interface including user input means for allowing a user to input responses to the composition instructions.

35. A system according to claim 34, wherein the computer is programmed with software for manipulating the gathered content information on the basis of the composition instructions and user responses thereto.

36. A software storage medium bearing content information which has been composition enhanced by means of the system of any one of claims 31 to 35.

37. A content gathering system according to claim 31, further including a user interface, wherein the composition instructions are provided as suggestions to a user of the content gathering apparatus via said user interface.

38. A content gathering apparatus according to claim 31, wherein the composition instructions are implemented by the system in the absence of countermanding instructions from the user.

39. A content gathering apparatus for gathering predetermined forms of content information, said apparatus including:
   content collecting means for collecting content information;
   metadata collecting means for collecting metadata from a plurality of different types of sources, said metadata being associated with the collected content information;
   template storage means for storing at least one template, each template including a plurality of template instructions; and
   processing means for executing the template instructions depending on any metadata collected, wherein the temple instructions when executed provide composition instructions for enhancing composition of the content information collected.

40. A content gathering apparatus according to claim 39, further including a user interface, wherein the composition instructions are provided as suggestions to a user of the content gathering apparatus via said user interface.

41. A content gathering apparatus according to claim 40, wherein the suggestions are generated at least in part on the basis of the content information gathered.

42. A content gathering apparatus according to claim 39, wherein the composition instructions are implemented by the content gathering apparatus in the absence of countermanding instructions.

43. A content gathering apparatus according to claim 39, wherein execution of the template instructions is dependent on the metadata.

44. A content gathering apparatus according to claim 39, further including input means for allowing user input in response to the composition suggestions.

45. A content gathering apparatus according to claim 44, wherein data input via said user input means forms further metadata for association with the collected content information.

46. A content gathering apparatus according to claim 45, wherein execution of the template instructions is further dependent on the data input via said user input means.

47. A content gathering apparatus according to claim 39, further including content information storage means for storing the gathered content information.

48. A content gathering apparatus according to claim 39, further including communication means for uploading said at least one template to the gathering apparatus.

49. A content gathering apparatus according to claim 39, wherein the content information gathered includes at least one of audio data, motion image data and still image data.

50. A content gathering apparatus according to claim 49, wherein the content information includes audio data and the template instructions when executed provide suggestions in relation to a mode of capturing the audio data.

51. A content gathering apparatus according to claim 50, wherein the mode of capturing the audio data is further dependent on a type of the audio data.

52. A content gathering apparatus according to claim 50, wherein the audio data is processed based on the mode of capturing the audio data.

53. A content gathering apparatus according to claim 49, wherein the content information includes audio data, where the template instructions when executed provide suggestions in relation to mixing of the audio data.

54. A content gathering apparatus according to claim 39, wherein the metadata is selected from the group consisting of the following pieces of information in relation to the content information gathered:
   data and time;
   location;
   apparatus orientation information;
   apparatus setting information; and
   information on user selected options.

55. A content gathering apparatus according to claim 39, the content gathering apparatus being selected from the group consisting of:
   a still camera;
   a video recorder;
   an image capture device;
   an audio recorder;
   an audio mixer; and
   an audio capture device.

* * * * *

UNITED STATES PATENT AND TRADEMARK OFFICE
CERTIFICATE OF CORRECTION

PATENT NO. : 6,606,117 B1
DATED : August 12, 2003
INVENTOR(S) : John Richard Windle It is certified that error appears in the above-identified patent and that said Letters Patent is hereby corrected as shown below:

Drawings,
Sheet No. 8, Fig. 11, Box 1104, "contenent" should read -- content --.

Column 3,
Line 28, "in which" ($2^{nd}$ occurrence) should be deleted.

Column 4,
Line 3, "the" should read -- The --.

Column 5,
Line 38, "customised" should read -- customized --.

Column 7,
Lines 3 and 7, "analysing" should read -- analyzing --.
Line 27, "(eg," should read -- (e.g., --.
Line 46, "optimise" should read -- optimize --.

Column 8,
Line 21, "analyses" should read -- analyzes --.
Line 22, "above" should read -- above. --.

Column 9,
Line 20, "alter," should read -- altar, --.
Line 29, "being recorded." should read -- recording. --.
Line 56, "a" should read -- and --.

Column 10,
Line 6, "analyse" should read -- analyze --.
Line 8, "analysers," should read -- analyzers --.
Lines 14 and 65, "analysers" should read -- analyzers --.
Line 51, "sens 810," should read -- zens 810, --.
Line 58, "analysed" should read -- analyzed --.

Column 11,
Line 2, "analysers" should read – analyzers --.
Line 12, "customising" should read -- customizing --.
Line 13, "user preferred" should read -- user-preferred --.
Line 26, "used" should read -- be used --.
Line 32, "analyses" should read -- analyzes --.

UNITED STATES PATENT AND TRADEMARK OFFICE
CERTIFICATE OF CORRECTION

PATENT NO. : 6,606,117 B1
DATED : August 12, 2003
INVENTOR(S) : John Richard Windle It is certified that error appears in the above-identified patent and that said Letters Patent is hereby corrected as shown below:

Column 12,
Line 1, "above described" should read -- above-described --.
Line 22, "utilised," should read -- utilized --.

Column 13,
Line 58, "latter" should read -- later --.

Signed and Sealed this

Twenty-second Day of June, 2004

JON W. DUDAS
*Acting Director of the United States Patent and Trademark Office*